United States Patent
Lutgen et al.

(10) Patent No.: US 8,953,941 B2
(45) Date of Patent: Feb. 10, 2015

(54) METHOD AND APPARATUS FOR IDENTIFYING A PORT IN A PASSIVE OPTICAL NETWORK

(71) Applicant: Tellabs Bedford, Inc., Naperville, IL (US)

(72) Inventors: Craig L. Lutgen, Richardson, TX (US); Mahlon D. Kimbrough, Sherman, TX (US)

(73) Assignee: Tellabs Bedford, Inc., Naperville, IL (US)

( * ) Notice: Subject to any disclaimer, the term of this patent is extended or adjusted under 35 U.S.C. 154(b) by 96 days.

(21) Appl. No.: 13/829,740

(22) Filed: Mar. 14, 2013

(65) Prior Publication Data

US 2014/0270772 A1    Sep. 18, 2014

(51) Int. Cl.
*H04J 14/00* (2006.01)
*H04B 10/27* (2013.01)

(52) U.S. Cl.
CPC ................................ *H04B 10/27* (2013.01)
USPC ................ 398/67; 398/70; 398/71; 398/72

(58) Field of Classification Search
USPC ................... 398/66, 67, 70, 71, 72
See application file for complete search history.

(56) References Cited

U.S. PATENT DOCUMENTS

| | | | |
|---|---|---|---|
| 8,107,824 B2 * | 1/2012 | Tsuchiya et al. | 398/168 |
| 2010/0290782 A1 * | 11/2010 | Lee et al. | 398/58 |
| 2012/0328287 A1 * | 12/2012 | Grosso | 398/34 |
| 2013/0259469 A1 * | 10/2013 | Smith et al. | 398/16 |

* cited by examiner

*Primary Examiner* — Dalzid Singh
(74) *Attorney, Agent, or Firm* — Hamilton, Brook, Smith & Reynolds, P.C.

(57) ABSTRACT

Typical passive optical networks (PONs) employ several optical network terminals (ONTs) connected to an optical line terminal (OLT) via an optical splitter/combiner (OSC). Due to the passive nature of the OSC, determining a port assignment of an ONT may be difficult or impossible. Methods described herein provide for identifying a port in a passive optical network, optionally as corresponding to an ONT. A first subset of the ONTs is caused to transmit a first signal, such as a status signal, with a respective attribute having a first value, and a second subset of the ONTs is caused to transmit a second signal with the respective attribute having a second value. At the OSC, the signals are detected as a function of the attribute and the first and second values. Results of this detection are reported, from which an identification of a port and associated ONT can be determined.

28 Claims, 6 Drawing Sheets

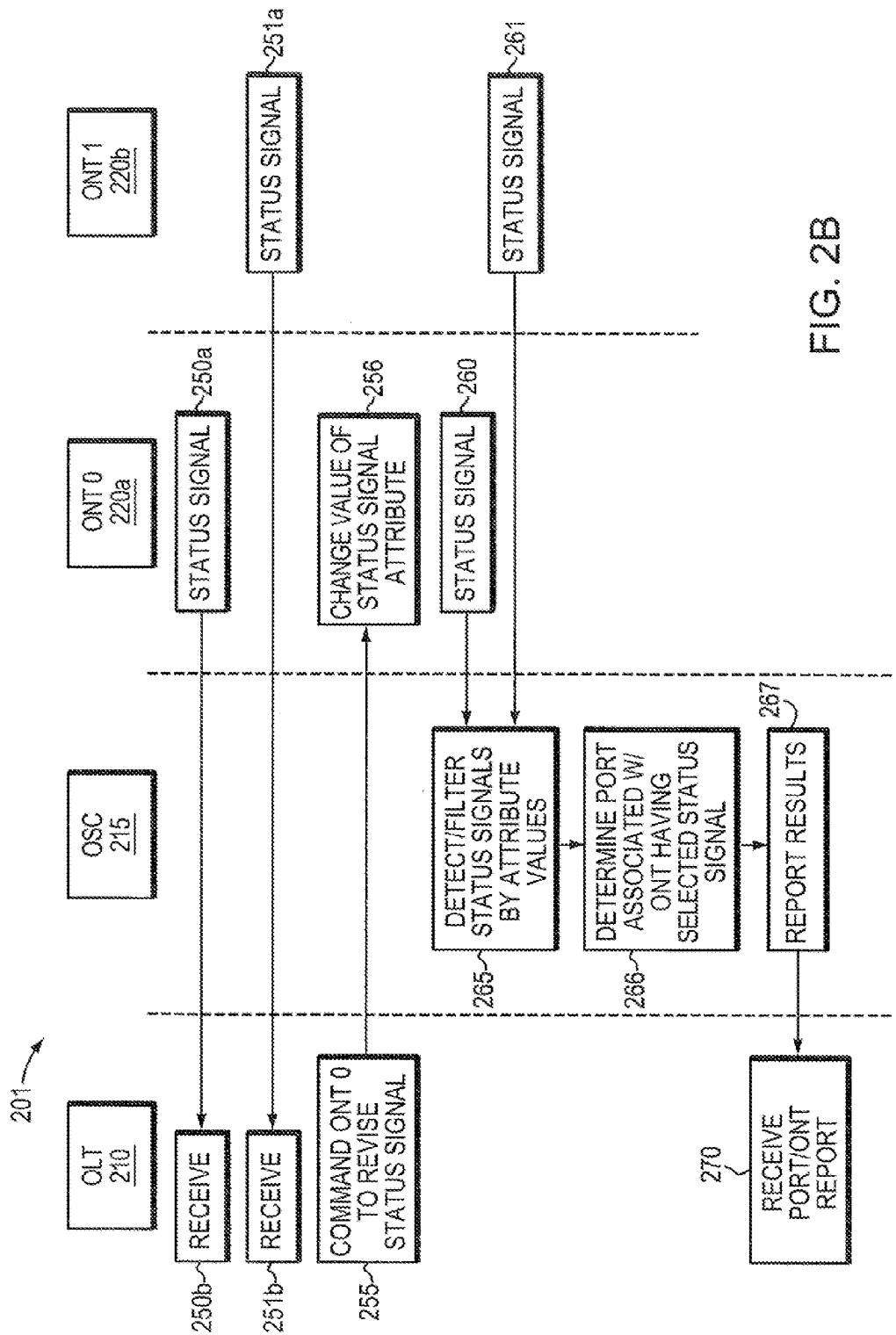

US 8,953,941 B2

METHOD AND APPARATUS FOR IDENTIFYING A PORT IN A PASSIVE OPTICAL NETWORK

BACKGROUND

A passive optical network (PON) can include multiple optical line terminals (OLTs), each connected by a shared optical fiber to a respective optical distribution network (ODN) with multiple optical network terminals (ONTs) on individual optical fibers. Using PON architecture, an ODN is enabled to form a communication channel from a single OLT to multiple ONTs via a system of passive optical components, including fiber optic cables and passive optical splitters/combiners.

A passive optical splitter/combiner (OSC) is optically disposed between the OLT and multiple ONTs, and operates to split a downstream optical signal passively as the downstream optical signal travels from the OLT to the multiple ONTs, and to combine multiple upstream optical signals passively from the ONTs into a single upstream signal to the OLT. The OSC provides an individual port for each ONT. Due to the passive nature of the OSC, it is difficult, if not impossible, to discern a particular port of the OSC to which a given ONT is currently connected. Typically, PON operators have been required to document and track the ODN configuration closely to determine a mapping between the ports and the ONTs. The documentation can become problematic and erroneous in cases in which network configurations change after initial installation, these problems present a possible long term liability for the operator.

SUMMARY

Example embodiments provide a system and method of locating a port in a passive optical network. A first subset of optical network terminals (ONTs), connected to an optical line terminal (OLT) via a passive optical splitter/combiner (OSC), is caused to transmit a first signal, with an attribute having a first value, to the OLT. A second subset of the ONTs is caused to transmit a second signal, with the attribute having a second value, to the OLT. At the OSC, the signals from the ONTs are detected as a function of the attribute and the first and second values. Results of this detection are reported, from which an identity or location of a port and associated subset of the plurality of ONTs can be determined.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments of the present invention.

FIG. 2B is a flow diagram illustrating a method of locating a port in a PON according to a further embodiment.

DETAILED DESCRIPTION OF THE INVENTION

A description of example embodiments of the invention follows.

Figure 1:
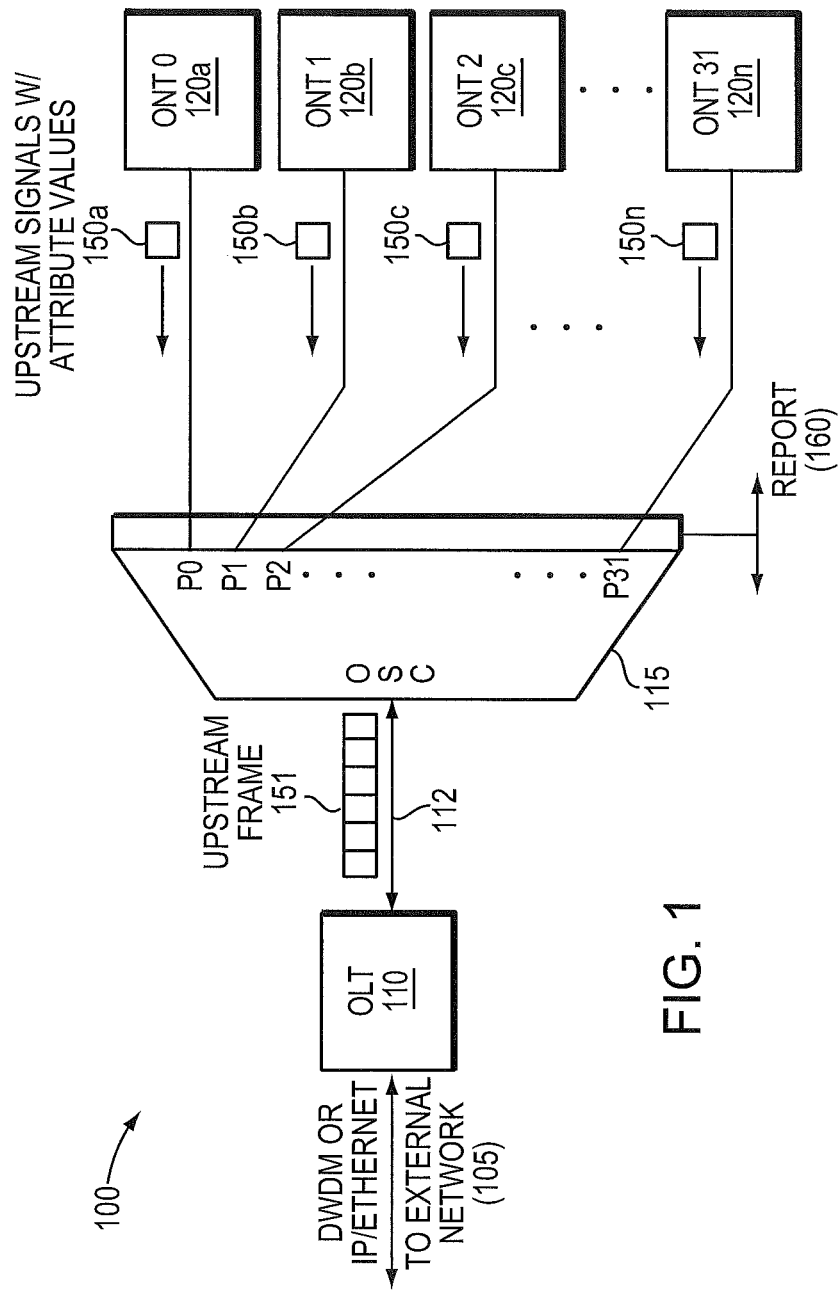
FIG. 1 is a block diagram of a passive optical network (PON) implementing an embodiment of the present invention.

FIG. 1 is a block diagram of a passive optical network (PON) 100 implementing an embodiment of the present invention. The PON 100 includes an optical line terminal (OLT) 110, which communicates with an external network 105 through the use of a dense wavelength division multiplexing (DWDM) or IP/Ethernet protocol. For ease of description, the PON 100 is described herein as including the OLT 110, although the OLT 110 is an active component. The OLT 110 exchanges communications between DWDM or IP/Ethernet and optical signaling and routes communications between the external network 105 and multiple (e.g., 32) optical network terminals (ONTs) 120*a-n*. The OLT 110 also transfers such communications between the OLT 110 and the ONTs 120*a-n* via an optical fiber 112. In order to facilitate optical signaling between the OLT 110 and the multiple ONTs 120*a-n*, a passive optical splitter/combiner (OSC) 115 is optically disposed between the OLT 110 and the ONTs 120*a-n*. The OSC 115 operates to split a downstream optical signal passively from the OLT 110 to the multiple ONTs 120*a-n*, and to combine the multiple upstream signals passively from the ONTs 120*a-n* into a single upstream signal to the OLT 110. For example, each of the ONTs 120*a-n* may transmit a respective upstream signal 150*a-n*, which is combined by the OSC 115 into an upstream frame 151 to the OLT 110 across the optical fiber 112. The upstream signals 150*a-n* may include status signals or data bursts, as understood in the art.

The OSC 115 provides an individual port P0-P31 for each ONT 120*a-n*. Prior art passive optical networks do not provide for locating or discerning a particular port to which a given ONT is connected. Ethernet systems typically employ a "link/activity" indicator to facilitate visual notification of connectivity on the remote side of a link. A common approach is to disconnect/connect the remote device and ascertain which port has "link" state change. Ethernet systems employ Layer 2 data link protocols for collecting link information. However, it is not practical to implement such solutions in a PON due to the passive nature of the network.

In order to provide for locating a port, P0-31, associated with a given ONT 120*a-n*, the OSC 115 includes or has associated therewith attribute value detector(s) 130. The attribute value detector(s) 130 may be one or more detectors located at one or more ports P0-P31 of the OSC 115, and are configured to detect an attribute of an upstream signal 150*a-n* from one or more of the ONTs 120*a-n*. In response to a command by the OLT 110, one or more ONTs (e.g., ONT0 120*a*) can be controlled to transmit an upstream signal (e.g., 150*a*) having an attribute value that is distinct from other upstream signals (e.g., 150*b-n*). The attribute value detector 130 can detect the distinct attribute value from the upstream signal 150*a* and determine the port (e.g., P0) at which the signal is detected. In response, the attribute value detector 130 can transmit a report 160 indicating the detected signal and associated port.

The report 160 can be transmitted upstream to the OLT 110 or to a host through the external network 105, or may be transmitted downstream to an ONT 120*a-n*. Alternatively, by modulating a signal into an optical channel, the report 160 may be transmitted as an in-band optical signal to the OLT 110 (via the optical fiber 112) or to one or more ONTs 120a-n. Because the ONT (e.g., ONT 120a) is selected to transmit the upstream signal 150a, the report 160 can be used to determine the port (e.g., P0) that is associated with the selected ONT (e.g., ONT 120a). The OSC 115, OLT 110, ONTs 120a-n, or other network element(s) receiving the report may provide a visible (e.g., a flashing light or display) or audible indication to convey to a network operator or user the identity of a port and associated ONT.

In a particular example, each upstream signal 150a-b may be a periodic status signal transmitted by each ONT 120a-n. According to an embodiment, a selected ONT (e.g., ONT 120a) may be controlled to transmit a status signal at a distinct frequency, which is detected by the attribute value detector 130 by a filter located at the port associated with the selected ONT. More specifically, in a periodic (e.g., 8 kHz) cycle, the OLT 110 may broadcast a grant map message to every ONT 120a-n, which instructs each ONT 120a-n as to which bit-time intervals in the next time-division multiplexing (TDM) frame it is allowed to transmit upstream signals, including both status signals and data bursts. To provide a basis for upstream status signals and retrieving status information from the ONTs 120a-n, the OLT 110 may provide a continuous grant of a minimal number of TDM time slots to every ONT 120a-n for an ONT management communications channel (OMCC).

Example embodiments may incorporate the OMCC as a channel through which the upstream signal (e.g., 150a) having an attribute value may be detected. To accomplish this, the OLT may generate grant maps that include commands to the ONTs that uniquely identify the OMCC bursts from all other regular data traffic bursts. For example, a grant map which includes OMCC commands may have allocations with a fixed width followed by a fixed inter-burst gap that is also uniquely larger than other gaps. This OMCC portion of a grant map allocation can be periodic with regard to the 8 kHz GPON frame intervals, employing various multiples of 8 kHz for the target ONTs 120a-n, e.g., 2 kHz, 1 kHz, 500 Hz, 250 Hz, etc. One or more of the ONTs 120a-n may then be controlled to transmit according to a grant map which includes an OMCC allocation having a periodicity that is distinct from that of the OMCC allocation of the other ONTs 120a-n. As a result, a low-bandwidth signal for the one or more ONTs 120a-n may be modulated via the grant maps which include OMCC commands.

To detect this low-bandwidth modulated signal, the attribute value detector 130 may employ an optical tap (not shown) at each port P0-P31 to extract a small fraction of the power from the main paths from the ONTs 120a-n into the OSC ports P0-P31. These optical taps may use a low speed photodiode sensor to detect the optical signals. This photodiode sensor may detect bit transitions on the order of the entire burst envelope of the OMCC, which may include hundreds of GPON bit-intervals. Hence, a low-speed (and low-cost) detector can be employed. The recovered signal can be filtered through any means known in the art to recover the target modulated signal. For example, the recovered signal can be fed through an appropriate band-pass filter to recover the target modulated signal. Further, the system may be configured such that the target modulated signal is recovered using, a high pass filter, low pass filter, or band stop filter. This recovered, low-bandwidth signal can be sensed on every port on the OSC 115 and reported, via out-of-band mechanisms such as the report 160, to the OLT 110 or some other management system. Thus, the OLT 110 is able to command individual ONTs 120a-n to generate unique, low frequency (<8 kHz) signals that can be used to identify the specific OSC 115 port, P0-P31, to which the respective ONT 120a-n is connected. An indication of this signal can be reported to an appropriate management system for cataloging or displaying the relevant status to an operator.

In alternative embodiments, the upstream signals 150a-n may be data bursts, and a selected ONT (e.g., ONT1 120b) may be caused to alter an attribute value (e.g., frequency) of its respective data bursts in a manner that is detected by the attribute value detector 130. The OLT 110 may cause the selected ONT to modify its respective data bursts using downstream commands, such as a grant map, that the ONTs 120a-n are configured to follow. It should be understood that other attributes, such as amplitude, phase, polarization, or other suitable attributes known in the art may be modified to provide a distinguishing, detectable signal to enable an appropriately configured detector to detect the attribute and corresponding distinguishing value(s).

Based on the foregoing description, a number of example embodiments are now presented.

An embodiment of the present invention provides a method for identifying a port in a Passive Optical Network (PON). In such an embodiment, a first subset of a plurality of optical network terminals (ONTs), which are connected to an optical line terminal (OLT) via an optical splitter/combiner (OSC), are made to transmit a first signal, with a respective attribute having a first value, to the OLT. Further, a second subset of the plurality of ONTs is caused to transmit a second signal, with the respective attribute having a second value, to the OLT. In response, the signals of the plurality of ONTs are detected at the OSC as a function of the attribute and the first and second values, and the result of this detection is reported. An embodiment of the method further includes identifying a port in the PON corresponding to at least one ONT of the plurality of ONTs based on the detecting. The attribute may be any signal attribute known in the art, such as frequency, such as frequency (or wavelength) of a carrier wave or modulation thereon. Yet another embodiment of the invention further comprises causing multiple subsets of the plurality of ONTs to each transmit a respective signal with the respective attribute having a respective value and detecting, at the OSC, the signals of the plurality of ONTs as a function of the attribute and the respective values.

In an embodiment of the invention, detecting the signals comprises comparing the frequency of the first signal against a target range of frequencies. According to an alternative embodiment of the invention, detecting the signals further comprises filtering the signals based on a frequency to cause the first signal to be detected apart from the second signal. In a similar embodiment, filtering signals to cause the first signal to be detected apart from the second signal further includes filtering frequencies having the first value.

Reporting the results of detecting the signals may be accomplished in any manner known in the art. Example embodiments report the results in an in-band upstream signal to the OLT, and/or an in-band downstream signal to one of the plurality of the ONTs, and/or an out-of-band signal. In yet another embodiment, reporting the results includes providing a visible and/or audible indication at at least one of the OLTs, OSC, and plurality of ONTs. Further, according to the principles of another embodiment of the invention, reporting the results includes indicating a port associated with the first and/or second subsets of the plurality of ONTs.

In an embodiment of the invention, the first and second signals that are transmitted upstream by the ONTs indicate a status of each subset of the plurality of ONTs. In an alternative embodiment these upstream signals may be data bursts.

An embodiment of the invention is further directed to a system for identifying a port in a PON. In an embodiment, the system comprises an OLT configured to control a first subset of a plurality of ONTs to transmit a first signal to the OLT with an attribute having a first value. The system further comprises a passive OSC configured to connect the OLT to the plurality of ONTs and the OSC includes a plurality of ports each associated with one of the plurality of ONTs. The system may further comprise a detector associated with the plurality of ports. The OLT may be configured to control a second subset of the plurality of ONTs to transmit a second signal to the OLT with an attribute having a second value, and the detector may be configured to detect the first signal based the attribute of the first signal, and further report the port associated with the first subset of the plurality of ONTs. In further embodiments, the system may be configured to execute the various embodiments of the method described hereinabove.

According to further embodiments of the system, the detector comprises at each port a tap and filter. In another embodiment, the detector further comprises a logic circuit. In yet another embodiment, the system may further comprise a logic circuit at each port associated with each corresponding tap and filter.

Figure 2A:
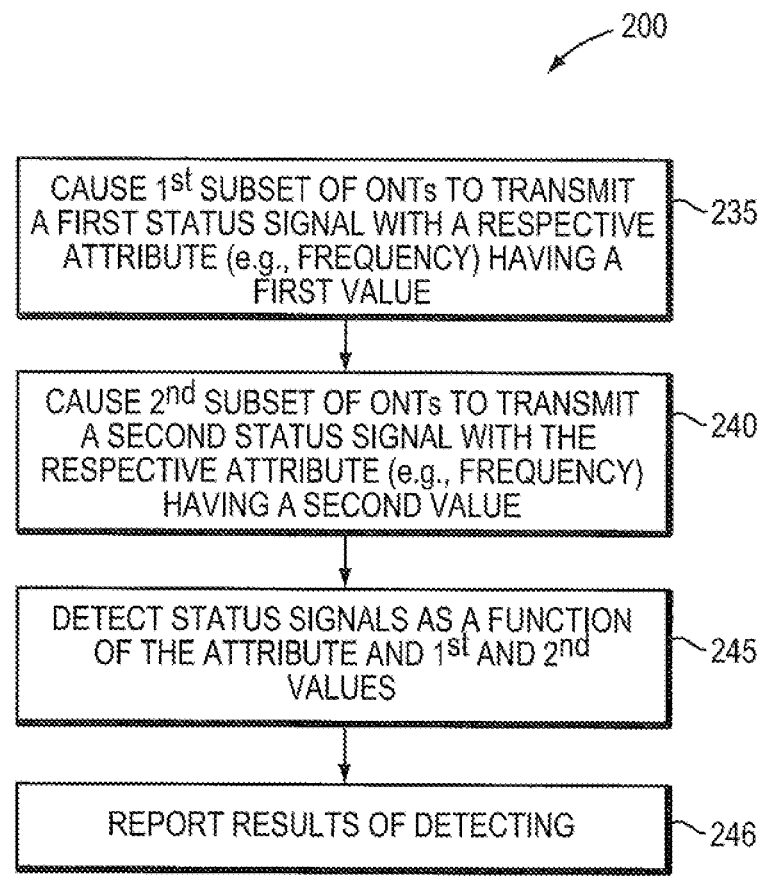
FIG. 2A is a flow diagram illustrating a method of locating a port in a PON according to one embodiment.

FIG. 2A is a flow diagram illustrating a method 200 of locating a port in a PON according to an embodiment of the present invention. This method 200 may be implemented in the PON 100 described above with reference to FIG. 1. A first subset of ONTs is first caused to transmit a first status signal with an attribute having a first value (235). This attribute may be, for example, a frequency of the status signal. A second subset of the ONTs is caused to transmit a second status signal with an attribute having a second value (240). Thus, if the attribute is a frequency of the respective status signals, then the first and second subset of ONTs may transmit status signals that differ by frequency, with the first subset sending a status signal at a frequency that is higher or lower than the frequency of the status signal transmitted by the second subset. The status signals may then be detected as a function of the attribute and the first and second values (245). For example, the first and second status signals may be filtered by frequency using high-pass or low-pass filters at the respective ports of an OSC where the status signals are recieved. The results of the detection may then be reported, which can enable a determination of an identity of a port associated with one or more of the ONTs (246).

FIG. 2B is a flow diagram illustrating a method 201 of locating a port in a PON according to a further embodiment of the invention. Although this example method 201 employs two ONTs (ONT0 220a and ONT1 220b), the method 201 can be implemented for any number of ONTs, where ONT0 220a and ONT1 220b may each represent one or more, or a subset, of ONTs. Further, the method 201 may be implemented to cause multiple ONTs to each transmit respective status signals at unique frequencies. These status signals may then be recovered at the respective ports of the OSC, according to the operation described hereinabove in respect to FIG. 1. These recovered signals may be appropriately filtered to recover the desired modulated signal. Such recovered signals may be used to determine the port of the OSC to which each ONT is connected.

Under normal operation of the PON, the ONT0 220a and ONT1 220b may each transmit to the OLT 210 a status signal having attribute values that are identical to one another. For example, the ONT0 220a may transmit a status signal 250a to the OLT 210 at a fixed frequency, and the ONT1 220b may transmit a status signal 251a to the OLT 210 at the same fixed frequency. Both of the status signals 250a and 251a may have attribute values, such as the aforementioned frequency, that are identical, and both are received by the OLT 210 at regular intervals (250b, 251b).

In order to initiate a process of identifying a port as corresponding to a selected ONT, the OLT 210 may command the selected ONT, ONT0 220a, to revise the status signals the ONT0 220a transmits by altering an attribute value of the status signal (255). The OLT 210 may command the selected ONT in any manner that is known in the art, such as using a downstream command, such as a grant map. In response, the ONT0 220a changes the value of the status signal attribute according to the command (256). Following this revision, both the ONT0 220a and the ONT1 220b continue to transmit respective status signals 260, 261. However, status signals 260 and 261 are distinct by the attribute value (e.g., frequency) revised by the ONT0 220a. The OSC 215 receives both status signals 260, 261 at respective ports (e.g., P0, P1) and detects which of the status signals 260, 261 has the revised attribute value. For example, if the status signal 260 is revised to transmit at a lower frequency, the OSC 215 may filter both of the signals 260, 261 via a low pass filter applied to a tap at each port. Because the detection of the status signals is specific to a particular port of the OSC 215, the OSC 215 can then determine which port is associated with the selected ONT transmitting the revised (e.g., lower frequency) status signal (266). The OSC 215 may then report the results of this detection (267), which may then be received by the OLT 210 (270), or other network elements, or, if transmitted wirelessly to a telephony network, by a handheld device, for example, of a craftsperson of a service provider.

While the method 201 has been described as varying the frequency attribute of a respective status signal, the method may operate by modifying other attributes of the status signals alone or in combination with frequency. For example, such other attributes may include amplitude, phase, and polarization. Furthermore, while the method 201 is described as varying the frequency of the status signals sent from the ONT0 220a, further embodiments of the method 201a may further include altering the status signals of any number of ONTs coupled to the OLT 210.

As described above, an embodiment of the method 201 may be used to determine the respective ports on an OSC to which any number (e.g., 32) of ONTs is connected. In such an embodiment, a respective attribute of each respective ONT may be uniquely varied such that the port to which each ONT is connected may be uniquely determined. For example, in an embodiment, each ONT may be commanded to send its respective status signals at unique frequencies. In such an embodiment, the ports may utilize appropriately tuned filters as described above to determine the frequency of the status signals received at each port, and thus determine the port to which each ONT is connected.

Figure 3:
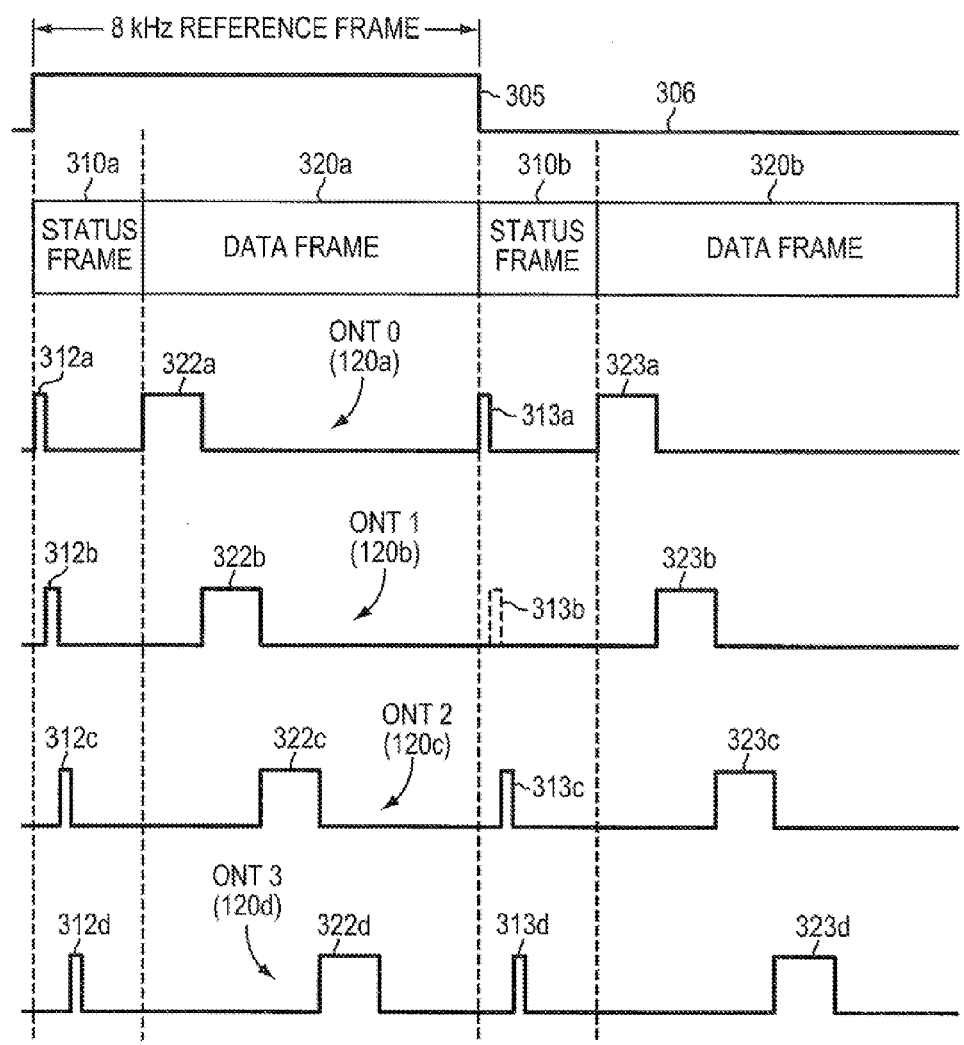
FIG. 3 is a signal diagram illustrating upstream communications of multiple optical network terminals (ONTs) in an embodiment of the invention.

FIG. 3 is a signal diagram illustrating upstream communication of multiple ONTs in an example embodiment. The signaling illustrated may represent an operation of the PON 100 described above with reference to FIG. 1, or of the methods 200, 201 described above with reference to FIGS. 2A-B. Referring to FIG. 3, a first reference frame 305 includes a status frame 310a, which includes the status signal transmitted by each ONT, and a data frame 320a, which includes the data transmitted by each ONT. Following the first reference frame 305, a second reference frame 306 includes a second status frame 310b and a second data frame 320b. Reference frames may be cycled at a fixed frequency, e.g., 8 kHz.

Each ONT (ONT0-ONT3) may be assigned a time slot within each reference frame 305, 306 to transmit a status signal (e.g., an OMCC signal) 312a-d, 313a, 313c, 313d, and a data signal 322*a-d*, 323*a-d*. The status signals, 312*a-d* and 313*a*, 313*c*, 313*d*, and the data signals, 322*a-d* and 323*a-d*, may be sent in accordance with downstream commands, such as TDM grant maps, from an OLT. An OSC, receiving these status and data signals from each of the ONTs at individual ports, may combine the signals into a single upstream frame to be sent to an OLT.

In this example embodiment, the ONT1 has been selected to transmit its status signals, with an attribute value that is distinct from the status signals transmitted by the other ONTs. Specifically, in the example embodiment illustrated in FIG. 3, ONT1 transmits its status signals, such as 312*b*, at a frequency that is half the frequency at which the remaining ONTs, ONT0, ONT2, and ONT3, transmit their respective status signals, 312*a*, 312*c-d*, 313*a*, and 313*c-d*. Thus, ONT0, ONT2 and ONT3 each transmit a status signal at 8 kHz by including a status signal within every reference frame 305, 306. In contrast, the ONT1 transmits a status signal at 4 kHz by including a status signal within every other reference frame. Such a configuration is illustrated by the waveform of ONT1, which includes a status signal 312*b* within the first reference frame 305, and a gap 313*b*, outlining an omission of a status signal, within the second reference frame 306. This omission 313*b* may be identified at a port of an OSC as described above. Because a particular ONT was commanded to transmit its respective status signals at half the frequency of the other ONTs, once this omission is detected at a particular port, it is known that the ONT is connected to that port.

In alternative embodiments, the ONTs may each transmit status signals at other frequencies or combinations of frequencies, thus, allowing the port to which each ONT0-3 connects to be determined. Further, the ONTs0-3 may be further configured to alter their respective status signals by an attribute other than frequency, such as amplitude.

Figure 4:
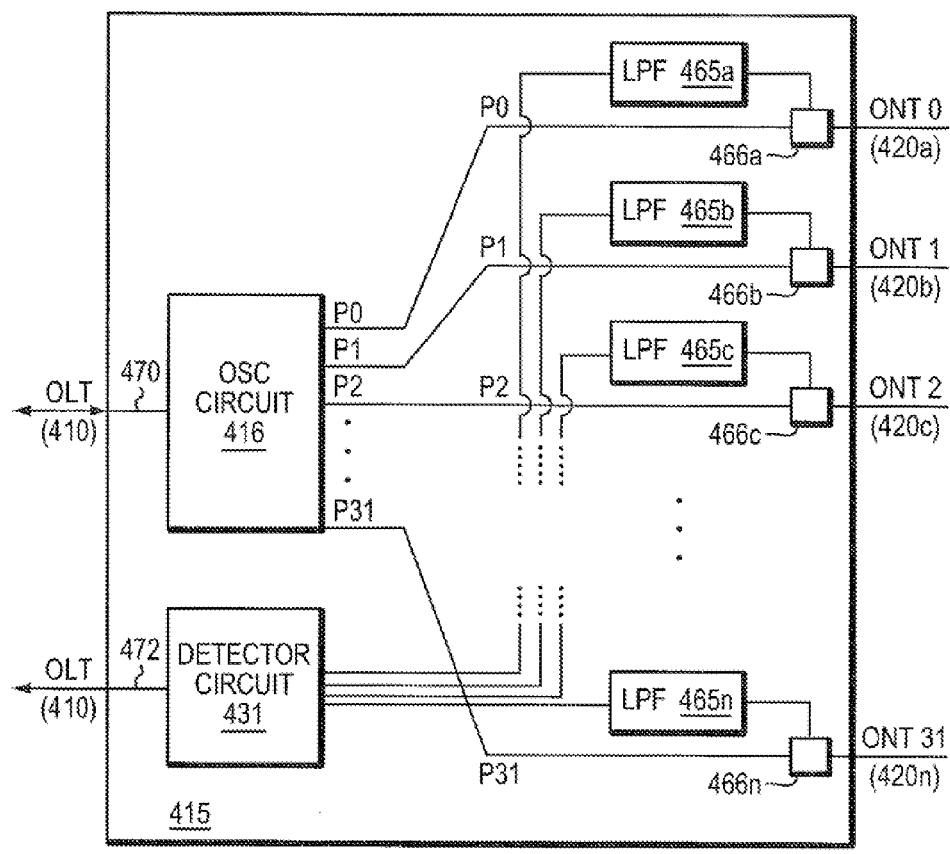
FIG. 4 is a block diagram of an optical splitter/combiner (OSC) according to an embodiment.

FIG. 4 is a block diagram of an optical splitter/combiner (OSC) 415 according to one embodiment. The OSC 415 may be implemented in the PON 100 described above with reference to FIG. 1, or may be implemented in the methods 200 and/or 201 described above with reference to FIGS. 2A-B. The OSC 415 routes optical signals between an OLT 410 and multiple ONTs 420*a-n*. The OSC 415 connects to each of the ONTs 420*a-n* via respective ports P0-P31. A passive OSC circuit 416 combines upstream signals at each of the ports P0-P31 into a single upstream frame to the OLT 410 via the fiber channel 470. Further the OSC circuit 416 splits downstream signals from the OLT 410 and transmits the downstream signals via the ports P0-P31 to the respective ONTs 420*a-n*.

The downstream signals from the OLT 410 may include downstream commands and data intended for the ONTs 420*a-n*. The OSC circuit 416 splits the downstream signals carrying data and downstream commands and sends the data and the commands or portions thereof to the ONTs 420*a-n*. Each ONT 420*a-n* may then recover, from the received data, the respective data intended for the respective ONT, as well as the relevant information from the downstream command, if needed. In an embodiment of the invention, the data sent downstream to the ONTs 420*a-n* may be encrypted such that each ONT 420*a-n* may only recover its own respective data.

At each port P0-P31 of the OSC 415, an optical tap 466*a-n* extracts a small fraction of the power from the main path of the port and uses a photodiode sensor to detect and recover the upstream optical signals from the ONTs 420*a-n*. Low-pass filters 465*a-n* are connected to each optical tap 466*a-n* to receive the recovered signals. In example embodiments, a selected one or more ONTs is controlled to transmit a status signal or other signal at a frequency that is lower than a comparable signal transmitted by the remaining ONTs. Accordingly, the low-pass filters 465*a-n* may be configured such that only the lower-frequency signal is forwarded to a detector circuit 431. The detector circuit 431 receives an output of each low-pass filter 465*a-n* and, in response to receiving the aforementioned lower-frequency signal, forwards a corresponding report via an out-of-band channel 472 to the OLT 410 or another network element. In alternative embodiments, by modulating a signal into an optical channel, the report may be transmitted as an in-band signal to the OLT via the optical channel 470, or may be transmitted as an in-band downstream signal to one or more of the ONTs 420*a-n*. The report may indicate the presence of the detected signal and the port at which the signal was received. Based on this report and an indication of the ONT selected to transmit the signal, the port associated with the selected ONT can be determined.

While the OSC 415 has been described as using low-pass filters 465*a-n*, embodiments of the invention may alternatively utilize any method or combination of methods known in the art to pass particular signals to the detector circuit 431. For example, an alternative embodiment of the invention uses band pass filters at each optical tap 466*a-n* to recover the received status signal.

The OSC 415 may be used to determine the port P0-P31 to which each ONT 420*a-n* is connected. Under normal operation, for example, each ONT 420*a-n* may be configured to transmit respective upstream status signals at a set frequency, such as 8 kHz. The low-pass filters 465*a-n* may be correspondingly tuned to prevent these 8 kHz status signals from reaching the detector circuit, and, thus, the port configuration would be unknown. An embodiment of the invention uses this property of the low-pass filters 465*a-n*, or any other appropriately selected filters, to determine the ports to which each ONT is connected.

To begin an example method of the invention, when it is desired to determine the port that the ONT0 420*a* is connected, first, a downstream command from the OLT 410 is sent to the ONT0 420*a* to modify an attribute of its respective upstream status signals. For example, this downstream command may be a TDM grant map that indicates that the ONT0 420*a* send upstream status signals at a frequency of 1 kHz. The ONT0 420*a* then complies with this downstream command and sends a status signal at 1 kHz. In this example, each low-pass filter 465*a-n* is properly tuned, for example, to allow signals with a frequency less than 1.2 kHz to pass through the filter. Thus, the status signals sent from the ONT0 420*a* at the commanded frequency of 1 kHz pass through the low-pass filter 465*a* and are received at the detector circuit 431. The detector circuit determines that a status signal is received from the port P0 and, in turn, that the ONT0 420*a* is connected to port P0. Once this is determined, the ONT0 420*a* is then commanded to send status signals at the standard value frequency, above 1.2 kHz (e.g., at 8 kHz), which does not pass through the low pass filter. This process is then repeated for every ONT 420*b-n* connected to the OSC 415 to determine the entire port configuration for the OSC 415.

As described herein, when a signal is passed to the detector circuit, the circuit may report these results in the form of an indicator light or audible noise, which indicates the port from which the signal was received. This indication may be received at the OLT, OSC, ONT, or any point connected to the detector circuit 431. In an example embodiment, a blinking light emitting diode (LED) corresponding with a particular port is used to indicate a port configuration.

An alternative embodiment of the invention may be further configured to operate in the inverse of the above described embodiment. Thus, the ONTs 420*a-n* may all be configured to send status signals at 1 kHz, thereby having every ONT's signal pass through to the detector circuit under normal operation. However, when it is desired to determine the port configuration, a particular ONT from the plurality is commanded to transmit its respective signal at a frequency higher than 1 kHz. This higher frequency status signal would then not pass through the low-pass filter and the detector circuit 431, in turn, determines the port that the detector circuit 431 is not receiving a signal from and, thus, determines the port configuration from the lack of a signal.

While an example has been provided that uses low-pass filters, further embodiments of the OSC 415 may use any filter known in the art. In such embodiments, commands from the OLT may be appropriately determined to allow the detector circuit 431 to determine the port configuration based on either the reception or lack of reception of signals. For example, in an embodiment using high pass filters, under normal operation, each ONT sends status signals at 1 kHz. Then, to determine port configurations, a selected ONT is commanded to send its status signals at a higher frequency, for example, 8 kHz. These higher frequency status signals pass through the high-pass filter and are received at the detector circuit 431, which can then determine the port configuration. Further embodiments may utilize band pass filters, or band stop filters, in conjunction with correspondingly appropriate commands from the OLT 410.

It should be understood that the filters may be more complex and may detect frequency status signals differently at many different frequencies. In an embodiment, many ONTs may be commanded simultaneously, and the frequencies of the commanded signals may generate uniquely distinguishable outputs that can be used to identify multiple port connectivities simultaneously.

Figure 5:
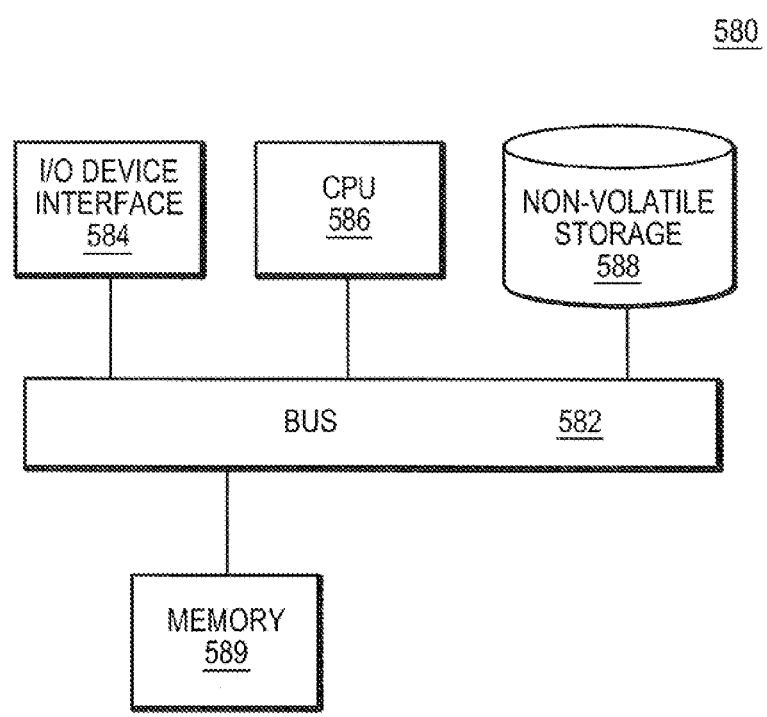
FIG. 5 is a simplified block diagram of a computer system in which the present invention may be embodied.

FIG. 5 is a high level block diagram of a computer system 580 in which embodiments of the present invention may be embodied. The system 580 contains a bus 582. The bus 582 is a connection between the various components of the system 580. Connected to the bus 582 is an input/output device interface 584 for connecting various input and output devices, such as a keyboard, mouse, display, speakers, etc. to the system 580. A Central Processing Unit (CPU) 586 is connected to the bus 582 and provides for the execution of computer instructions. Memory 589 provides volatile storage for data used for carrying out computer instructions. Disk storage 588 provides non-volatile storage for software instructions, such as an operating system (OS).

It should be understood that the example embodiments described above may be implemented in many different ways. In some instances, the various methods and machines described herein may each be implemented by a physical, virtual, or hybrid general purpose computer, such as the computer system 580. The computer system 580 may be transformed into the machines that execute the methods described above, for example, by loading software instruction into either memory 589 or non-volatile storage 588 for execution by the CPU 586.

Embodiments or aspects thereof may be implemented in the form of hardware, firmware, or software. If implemented in software the software may be stored on any non-transient computer readable medium that is configured to enable a processor to load the software or subsets of instructions thereof. The processor then executes the instructions and is configured to operate or cause an apparatus to operate in a manner as described herein.

While this invention has been particularly shown and described with references to example embodiments thereof, it will be understood by those skilled in the art that various changes in form and details may be made therein without departing from the scope of the invention encompassed by the appended claims.

What is claimed is:

1. A method of identifying a port in a passive optical network (PON), comprising:
   causing a first subset of a plurality of optical network terminals (ONTs), connected to an optical line terminal (OLT) via a passive optical splitter/combiner (OSC) to transmit a first signal with a respective attribute having a first value to the OLT;
   causing a second subset of the plurality of ONTs to transmit a second signal with the respective attribute having a second value to the OLT;
   detecting, at the OSC, the signals of the plurality of ONTs as a function of the attribute and the first and second values; and
   reporting results of the detecting.

2. The method of claim 1, further comprising identifying a port in the PON corresponding to at least one ONT of the plurality of ONTs based on the detecting.

3. The method of claim 1, wherein the attribute includes a frequency of the signal.

4. The method of claim 3, wherein detecting the signals further comprises comparing the frequency of the first signal against a target range of frequencies.

5. The method of claim 1, wherein detecting the signals further comprises filtering the signals based on a frequency to cause the first signal to be detected apart from the second signal.

6. The method of claim 5, wherein the filtering includes filtering frequencies having the first value.

7. The method of claim 1, wherein reporting the results includes transmitting an in-band upstream signal to the OLT.

8. The method of claim 1, wherein reporting the results includes transmitting an in-band downstream signal to the one of the plurality of ONTs.

9. The method of claim 1, wherein reporting the results includes transmitting an out-of-band signal.

10. The method of claim 1, wherein the first and second signal indicate a status of each subset of the plurality of ONTs.

11. The method of claim 1, wherein the signals are each an upstream data burst.

12. The method of claim 1, wherein reporting the results includes providing one of a visible or audible indication at at least one of the OLT, OSC, and plurality of ONTs.

13. The method of claim 1, wherein reporting the results includes indicating a port associated with the first and/or second subsets of the plurality of ONTs.

14. The method of claim 1 further comprising:
   causing multiple subsets of the plurality of ONTs to each transmit a respective signal with the respective attribute having a respective value; and
   detecting, at the OSC, the signals of the plurality of ONTs as a function of the attribute and the respective values.

15. A system for identifying a port in a passive optical network, comprising:
   an optical line terminal (OLT) configured to control a first subset of a plurality of optical network terminals (ONTs) to transmit a first signal to the OLT with a respective attribute having a first value;
   a passive optical splitter/combiner (OSC) configured to connect the OLT to the plurality of ONTs, the OSC including a plurality of ports each associated with one of the plurality of ONTs;

a detector associated with the plurality of ports; and the OLT configured to control a second subset of the plurality of ONTs to transmit a second signal to the OLT with the respective attribute having a second value, the detector detecting the first signal based on the attribute of the first signal, and the detector further reporting the port associated with the first subset of the plurality of ONTs.

16. The system of claim 15, wherein the detector is further configured to compare the first value of the respective attribute against a target range of frequencies.

17. The system of claim 15, wherein the detector is further configured to filter the signals based on frequency such that the first signal is detected apart from the second signal.

18. The system of claim 17, wherein filtering the signals includes filtering frequencies having the first value.

19. The system of claim 15, wherein the detector is further configured to transmit an in-band upstream signal to the OLT.

20. The system of claim 15, wherein the detector is further configured to transmit an in-band downstream signal to the first subset of the plurality of ONTs.

21. The system of claim 15, wherein the detector is further configured to transmit an out-of-band signal.

22. The system of claim 15, wherein the signals indicate a status of each of the plurality of ONTs.

23. The system of claim 15, wherein the signals are an upstream data burst.

24. The system of claim 15, wherein at least one of the detector, OLT, OSC, and the plurality of ONTs is further configured to provide a visible or audible indication corresponding to reporting the port.

25. The system of claim 15, wherein the detector comprises at each port a tap and a filter.

26. The system of claim 25, wherein the detector further comprises a logic circuit.

27. The system of claim 25 further comprising a logic circuit at each port associated with the tap and the filter.

28. An apparatus for identifying a port in a passive optical network, comprising:

means for controlling a plurality of optical network terminals (ONTs) connected to an optical line terminal (OLT) via a passive optical splitter/combiner (OSC) to each transmit a first signal to the OLT with a respective attribute having a first value;

means for controlling a subset of the plurality of ONTs to transmit a second signal to the OLT with the respective attribute having a second value;

means for detecting, at the passive optical splitter, the second signal of the subset of the plurality of ONTs based on the respective attribute of the second signal; and means for reporting the port associated with the subset of the plurality of ONTs.

* * * * *